United States Patent [19]

Murata

[11] Patent Number: 5,845,055
[45] Date of Patent: Dec. 1, 1998

[54] OUTPUT APPARATUS AND METHOD FOR ACCOMODATING A PLURALITY OF SIGNAL TERMINAL IDENTIFICATIONS

[75] Inventor: Masahiko Murata, Tama, Japan

[73] Assignee: Canon Kabushiki Kaisha, Tokyo, Japan

[21] Appl. No.: 918,135

[22] Filed: Aug. 27, 1997

Related U.S. Application Data

[63] Continuation of Ser. No. 430,145, Apr. 26, 1995, abandoned, which is a continuation of Ser. No. 83,528, Jun. 30, 1993, abandoned.

[30] Foreign Application Priority Data

Jul. 1, 1992 [JP] Japan .................................... 4-174080

[51] Int. Cl.[6] .................................................... G06F 9/455
[52] U.S. Cl. ........................... 395/112; 395/500; 395/114
[58] Field of Search .................................. 395/500, 112, 395/107, 566, 835, 114; 364/578

[56] References Cited

U.S. PATENT DOCUMENTS

| | | | |
|---|---|---|---|
| 4,603,385 | 7/1986 | Muller et al. ............................. | 395/500 |
| 4,823,192 | 4/1989 | Shimezu et al. ........................ | 358/409 |
| 4,852,041 | 7/1989 | Nakana ................................... | 395/500 |
| 5,038,299 | 8/1991 | Maeda ..................................... | 355/836 |
| 5,056,043 | 10/1991 | Hawkes ................................... | 395/109 |
| 5,075,874 | 12/1991 | Steeves et al. ........................... | 395/112 |
| 5,140,675 | 8/1992 | Okada ..................................... | 395/114 |
| 5,267,124 | 11/1993 | Ito .......................................... | 361/785 |
| 5,268,993 | 12/1993 | Ikenoue et al. .......................... | 395/114 |
| 5,293,466 | 3/1994 | Bringmann .............................. | 395/114 |
| 5,332,320 | 7/1994 | Ohara ...................................... | 400/76 |
| 5,467,432 | 11/1995 | Ota ......................................... | 395/112 |
| 5,475,801 | 12/1995 | Brindle et al. ........................... | 395/114 |
| 5,497,450 | 3/1996 | Helmbold et al. ...................... | 395/114 |
| 5,568,594 | 10/1996 | Suzuki .................................... | 395/112 |

FOREIGN PATENT DOCUMENTS

| | | |
|---|---|---|
| 3-16649 | 3/1991 | Japan . |
| 2197099 | 5/1988 | United Kingdom . |
| 90 12359 | 10/1993 | WIPO . |

OTHER PUBLICATIONS

Rudolf F. Graf, "Modern Dictionary of Electronics." 6th Ed. (Indianapolis, Indiana: Howard W. Sams & Co., Inc., 1984), p. 340.

Primary Examiner—Zarni Maung
Attorney, Agent, or Firm—Fitzpatrick, Cella, Harper & Scinto

[57] ABSTRACT

An output apparatus includes a determination device for determining a control program for analyzing data input from an external apparatus from among a plurality of control programs, and a control device for adjusting connections with the external apparatus in accordance with the determination of the determination device. An output method includes the steps of determining a control program for analyzing data input from an external apparatus from among a plurality of control programs, and adjusting connections with the external apparatus in accordance with the determination.

12 Claims, 8 Drawing Sheets

OUTPUT APPARATUS AND METHOD FOR ACCOMODATING A PLURALITY OF SIGNAL TERMINAL IDENTIFICATIONS

This application is a continuation of application Ser. No. 08/430,145, filed Apr. 26, 1995, now abandoned, which was a continuation of Application Ser. No. 08/083,528, filed Jun. 30, 1993, now abandoned.

BACKGROUND OF THE INVENTION

1. Field of the Invention

The disclosed invention relates to an output apparatus and an output method in which image data are formed and output based on data transmitted from an external apparatus.

2. Description of the Related Art

Various conventional output apparatuses of the above-described type have the same signal terminal arrangement of interface connectors. This may be taken into consideration when emulating such output apparatuses. Emulate is sometimes defined to mean "imitate one system with another, such that the imitating system accepts the same data, executes the same programs, and achieves the same results as the imitated system". Rudolf F. Graf, *Modern Dictionary of Electronics,* 6th Ed. (Indianapolis, Ind.: Howard W. Sams & Co., Inc., 1984), 340. Such systems may be combinations of hardware and software. In addition, a plurality of preliminary signals are provided or the signal arrangement is converted outside the output apparatus in consideration of achieving flexibility.

In the above-described conventional apparatus, the signal terminal arrangement, i.e., connector pins and sockets, of an interface connector is fixed. Hence, when the signal arrangement differs from that of various types of output apparatuses to be emulated, cables suitable for one type of output apparatus for connection with a host computer cannot be used with another type of output apparatus for connection with a host computer. Accordingly, different connection cables must be provided for various types of host computers.

SUMMARY OF THE INVENTION

The present invention has been made in consideration of the above-described problems.

It is an object of the present invention to provide an output apparatus and an output method in which the arrangement of signals in a connector for receiving data from the outside can be internally adjusted to a control program for analyzing the data.

According to one aspect, the present invention which achieves this objective relates to an output apparatus comprising determination means for determining a control program for analyzing data input from an external apparatus from among a plurality of control programs, and control means for adjusting connection with the external apparatus in accordance with the determination of the determination means.

According to another aspect of the present invention, the present invention which achieves this objective relates to an output method comprising the steps of determining a control program for analyzing data input from an external apparatus from among a plurality of control programs, and adjusting connection with the external apparatus in accordance with the determination.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Figure 6:
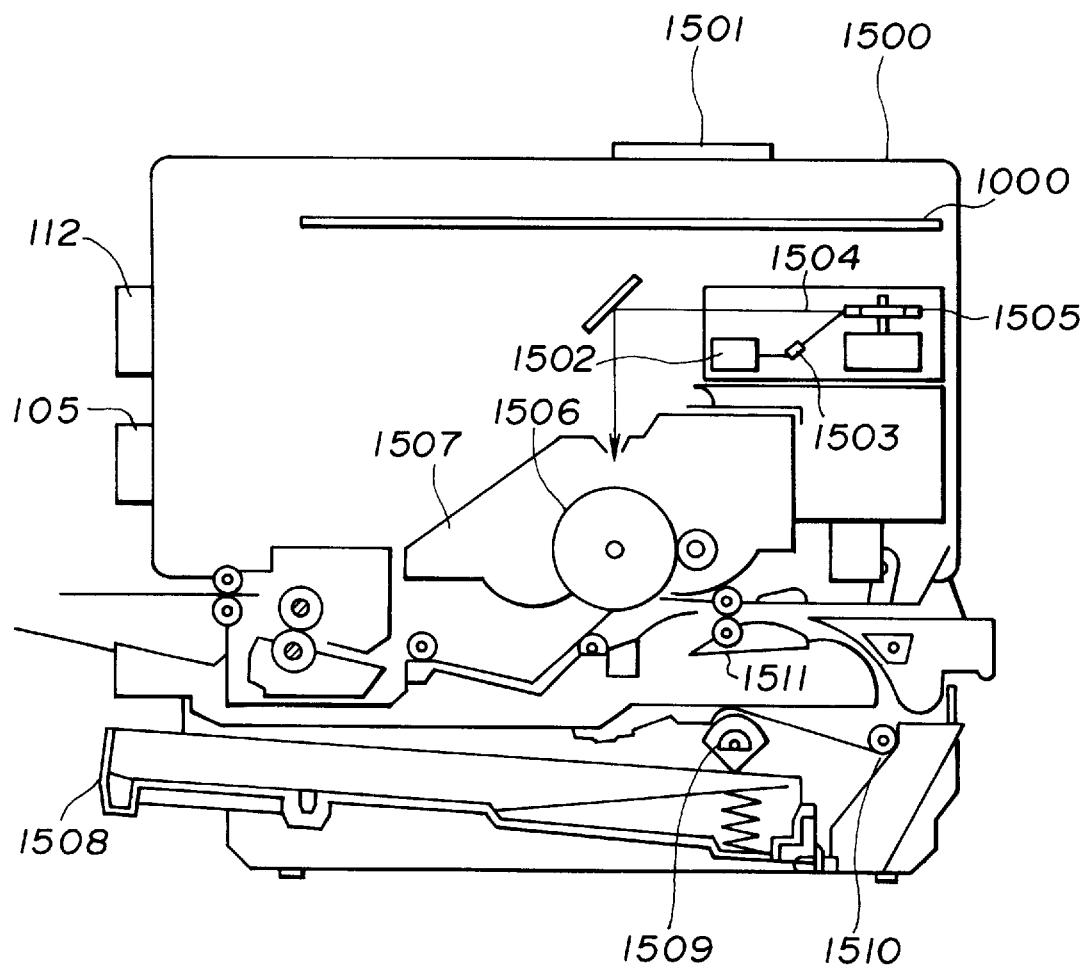
FIG. 6 is a cross-sectional view showing the configuration of a first printing apparatus to which the present invention can be applied.
Figure 7:
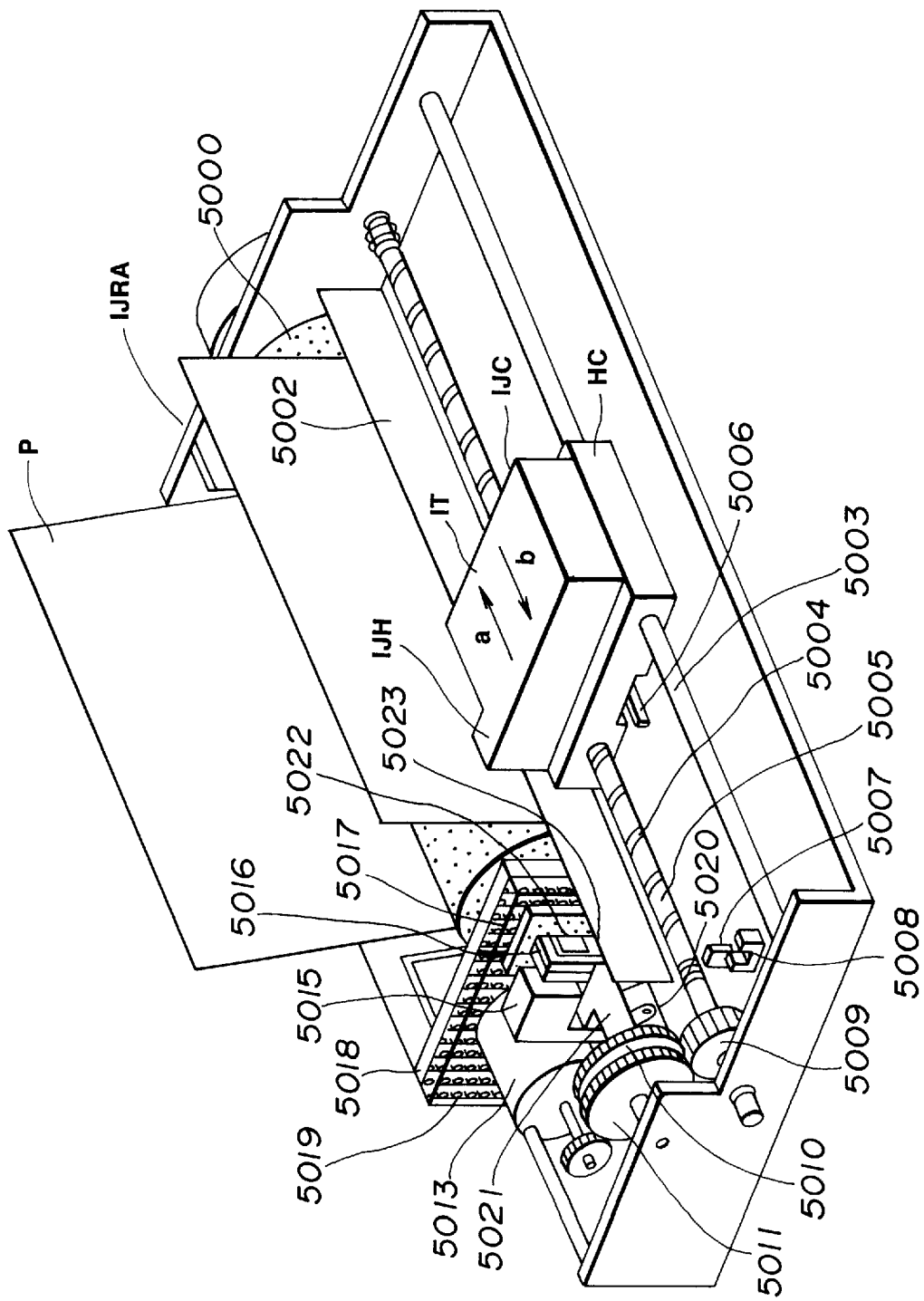
FIG. 7 is a perspective view showing an external appearance of a second printing apparatus to which the present invention can be applied.
Figure 8:
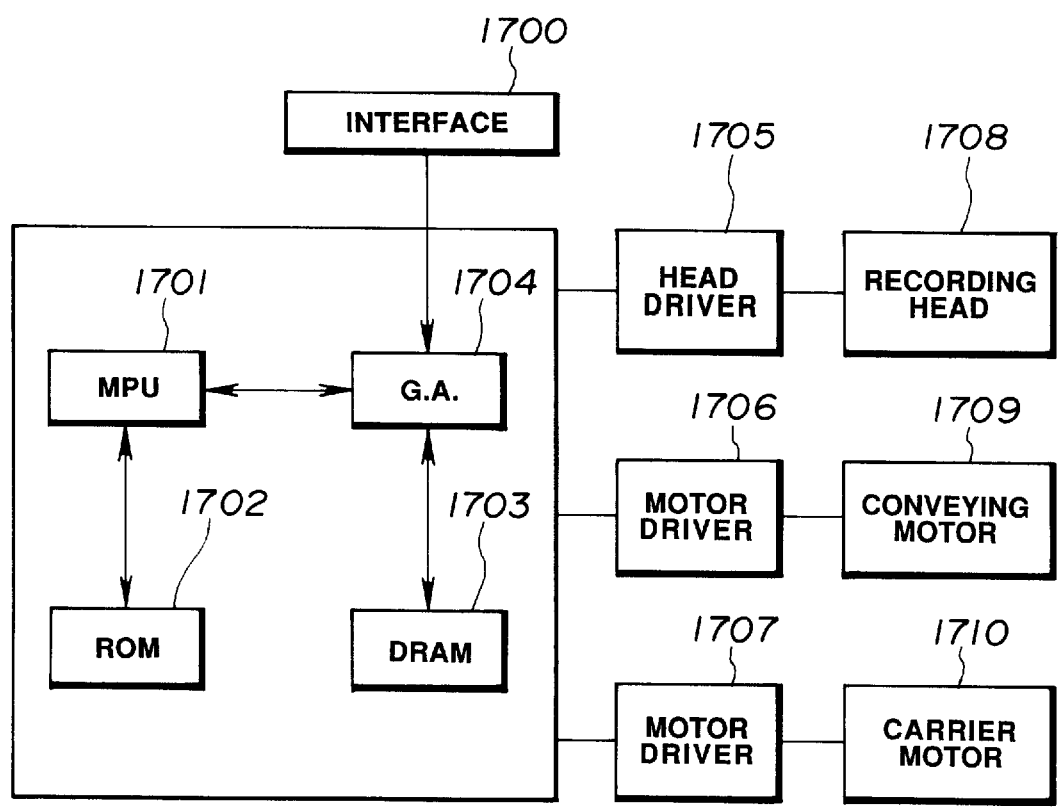
FIG. 8 is a block diagram illustrating the configuration of control in the second printing apparatus shown in FIG. 7.

Before describing the configurations of the preferred embodiments of the present invention, a description will be provided of the configuration of a laser-beam printer and an ink-jet printer to which the present embodiments may be applied with reference to FIGS. 6 through 8. Printers to which the present embodiments may be applied are not limited to laser-beam printers and ink-jet printers. However, the present embodiments may, of course, be applied to printers using any other printing methods.

FIG. 6 is a cross-sectional view showing the configuration of a first recording apparatus to which the present invention may be applied, and illustrates the case of using a laser-beam printer (LBP).

In FIG. 6, main body 1500 of the LBP houses equipment that inputs and stores printing information and the like supplied from a host computer externally connected via an interface cable (not shown), forms the corresponding bit-map images and the like in accordance with the information, and forms an image on recording paper, serving as a recording medium. Operation panel 1501 includes switches for selecting operations, LED display units and the like. Printer control unit 1000 controls all of equipment housed in the main body 1500 of the LBP, and analyzes the printing information and the like supplied from the host computer. Printer control unit 1000 converts the printing information into a video signal having the corresponding bit pattern, and outputs the signal to laser driver 1502. Laser driver 1502 includes circuitry for driving semiconductor laser 1503, and performs on-off switching of laser light beam 1504 emitted from semiconductor laser 1503 in accordance with the input video signal. Laser light beam 1504 is deflected in a direction perpendicular to the plane of FIG. 6 by rotating polygonal mirror 1505 to perform a scanning exposure of the surface of electrostatic drum 1506. Thus, an electrostatic latent image having a character pattern is formed on the surface of electrostatic drum 1506. The latent image is developed by developing unit 1507 disposed around electrostatic drum 1506, and the developed image is transferred onto a recording medium, which may be paper (not shown).

The recording medium comprises cut sheets, which are accommodated within sheet cassette 1508 mounted in main body 1500 of the LBP. A cut sheet is fed into the apparatus by sheet-feeding roller 1509, conveying roller 1510 and conveying rollers 1511, and is supplied to electrostatic drum 1506.

FIG. 7 illustrates an external appearance showing the configuration of a second recording apparatus to which the present invention may be applied, and illustrates the case of using an ink-jet recording apparatus (IJRA).

In FIG. 7, carriage HC, which engages spiral groove 5004 of lead screw 5005, rotating by the forward or reverse rotation of driving motor 5013, via driving-force transmission gears 5011 and 5009, includes a pin (not shown) for engaging spiral groove 5004, and reciprocates in the directions of arrows "a" and "b". Ink-jet cartridge IJC is mounted on carriage HC. Sheet-pressing plate 5002 presses a sheet against platen 5000 over the moving range of the carriage. Photocoupler components 5007 and 5008 functions as home-position detection means for confirming the presence of lever 5006 of the carriage at that position, and performing switching of the direction of rotation of motor 5013, and the like. Member 5016 supports cap member 5022 which caps the entire surface of a recording head. Suction means 5015 provides a vacuum inside of the cap member 5022, to perform suction recovery of the recording head ink via opening 5023 within the cap. Cleaning blade 5017 can be moved in the forward and backward directions by member 5019. Supporting plate 5018 of the main body supports the above-described cleaning blade 5017 and member 5019. Lever 5021 for starting suction of suction recovery moves in accordance with the movement of cam 5020 which engages the carriage HC. The driving force from the driving motor is transmitted by a known transmission means, such as a clutch or the like.

The above-described capping, cleaning, and suction recovery means are configured so that desired processing can be performed at respective corresponding positions by the function of the lead screw 5005 when the carriage is at the home position side. Any configuration may be adopted provided that a desired operation can be performed at a predetermined timing.

FIG. 8 is a block diagram illustrating the configuration of control of the second recording apparatus shown in FIG. 7.

In FIG. 7, there are shown interface 1700 for inputting recording signals via an interface cable (not shown), MPU 1701, program ROM 1702 which stores control programs to be executed by MPU 1701, and DRAM 1703 for storing various kinds of data (e.g., the above-described recording signals, recording data supplied to the head, and the like). Gate array 1704 controls the supply of recording data to recording head 1708 and the transfer of data between interface 1700, MPU 1701 and DRAM 1703. There are also shown carrier motor 1710 for carrying recording head 1708, conveying motor 1709 for conveying recording paper, head driver 1705 for driving the recording head, motor driver 1706 for driving conveying motor 1709, and motor driver 1707 for driving carrier motor 1710.

In the recording apparatus having the above-described configuration, when a recording signal has been input from a host computer via interface 1700, the recording signal is converted into recording data for printing by gate array 1704 and MPU 1701. Linked with the drive of motor drivers 1706 and 1707, recording head 1708 is driven in accordance with the recording data transmitted to head driver 1705. Thus, printing is executed.

Figure 1:
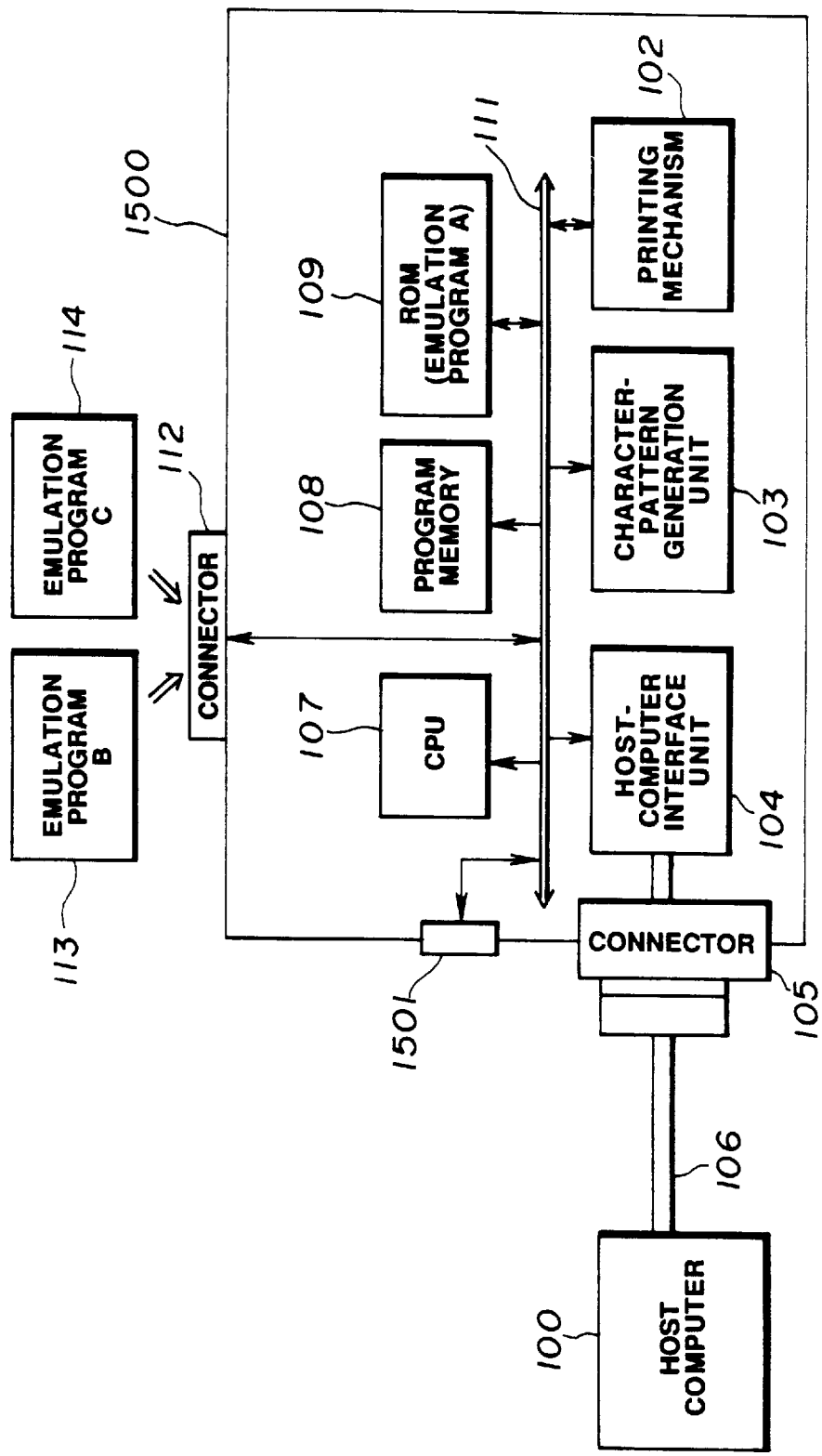
FIG. 1 is a block diagram showing the configuration of a printing apparatus according to a first embodiment of the present invention.

FIG. 1 is a block diagram illustrating the configuration of a printer control system according to a first embodiment of the present invention. A description will be provided illustrating a laser-beam printer (LBP) (see FIG. 6).

In FIG. 1, reference numeral 1500 represents the main body of an LBP of the present embodiment, and reference numeral 102 represents a printing mechanism for performing printing on recording medium. Character-pattern generation unit 103 for generating a character pattern to be printed includes a character-font memory, an image memory and the like (not shown). Host-computer interface unit 104 performs an interfacing operation when data are received from a host computer 100. Interface connector 105 connects the apparatus to the host computer using interface cable 106. CPU 107 controls the respective units shown in FIG. 1. Program memory (including a ROM (read-only memory)) 108 stores the procedure of the entire processing of CPU 107 relating to printing processing. ROM 109 stores an "emulation program A (control program A)" for controlling the respective units in place of the control program stored in ROM 108 when the present printing apparatus is used as an emulating printing apparatus, and interface control information. Operation panel 1501, which includes switches, keys, and the like, instructs the selection whether the printing apparatus must be operated in accordance with the control program stored in program memory 108, or the emulation program (control program A) stored in ROM 109, and inputs various kinds of other information. System bus 111 connects the above-described respective units having various functions. Connector 112 for an external memory is connected to system bus 111. External memory devices (each including a ROM) 113 and 114 are connected from the outside of the printing apparatus to supply different kinds of emulation programs (control programs). Memory devices 113 and 114 store an "emulation program B (control program B)" and an "emulation program C (control program C)", respectively, and respective interface control information. In the present embodiment, the selection of any one of the control program stored in memory 108 and the emulation programs stored in memories 109, 113 and 114 is instructed through operation panel 1501. An image is formed from data from host computer 100 by character-pattern generation unit 103, and printing is performed by printing mechanism 102. Program memory 108, ROM 109, and external memory devices 113 and 114 store interface control information relating to the connector pin positions and the use of the interface connector used for the execution of each emulation programs. The details thereof will be described later.

Figure 2:
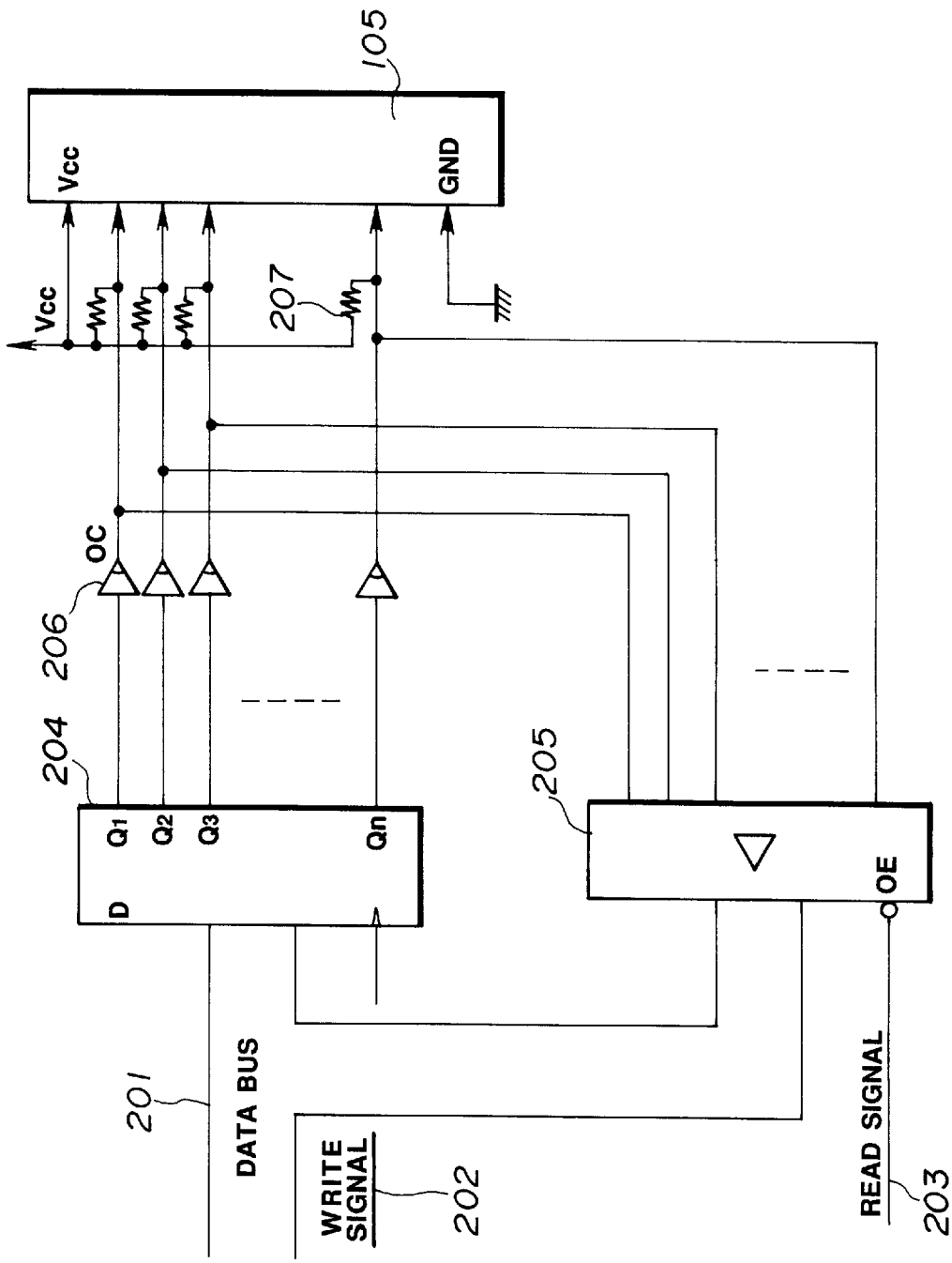
FIG. 2 is block digram of a host-computer interface unit of the apparatus shown in FIG. 1.

FIG. 2 shows the details of host-computer interface unit 104 in the present embodiment.

In FIG. 2, data bus 201 is a part of system bus 111 shown in FIG. 1. There are shown write signal 202, read signal 203, flip-flop 204, input buffer 205, open-collector 5 output buffers 206, pull-up resistors 207 and interface connector 105. These components are connected as shown in FIG. 2.

A description will now be provided of a specific operation of the printing apparatus of the present embodiment with reference to FIGS. 1 and 2.

The LBP 1500 can select a control program according to an instruction from operation panel 1501. When an external memory device which stores emulation programs and the like is connected to connector 112, such programs are automatically selected as control programs. A control program stored in the memory device connected to connector 112 may be selected through operation panel 1501.

In general, the connector pin arrangement in a connector for interface signals and the number of control signals differ between printing apparatuses. For example, in the case of a Centronix interface, each printing apparatus unsystematically allocates particular control lines and the like to vacant connector pins, though the basic arrangement is the same. These allocated connector pins have in many cases an important role when controlling the printing apparatus.

In the present embodiment, the printing apparatus can deal with particular control signals no matter where they are allocated.

First, the selected control program takes out interface control information relating to the connector pin arrangement of respective control signals of the printing apparatus to be emulated from the memory of the emulating apparatus. Flip-flop circuit 204 shown in FIG. 2 holds the value of the data bus by write signal 202. Respective bit signals of flip-flop 204 are connected to interface connector 105 via output buffer 206. When outputting data to a specific terminal or pin of the connector, the data is set to a specific bit signal of the flip-flop, and the corresponding terminal is used as an output control signal. The signal at each terminal of interface connector 105 is provided by supplying read signal 203 to input buffer 205. That is, CPU 107 obtains the corresponding data via the data bus by outputting read signal 203.

By setting "1" to the corresponding bit signal of flip-flop circuit 204, and making output buffer 206 OFF, i.e., a High level, CPU 107 recognizes the state of the corresponding bit signal via buffer 205. This indicates that a specific terminal of interface connector input scan be used as an input signal. The selected control program writes the control information in the flip-flop whose corresponding connector pin is connected to the connector pin device of the printing apparatus to be emulated, and reads the signal connected to the corresponding connector pin from input buffer 205, whereby the control signal of the priting apparatus to be emulated can be output and input with the same connector pin arrangement as that of the emulating printing apparatus. This operation is performed by defining control signals for respective bit signals of flip-flop circuit 204, serving as an output port, and input buffer 205, serving as an input port.

Figure 3:
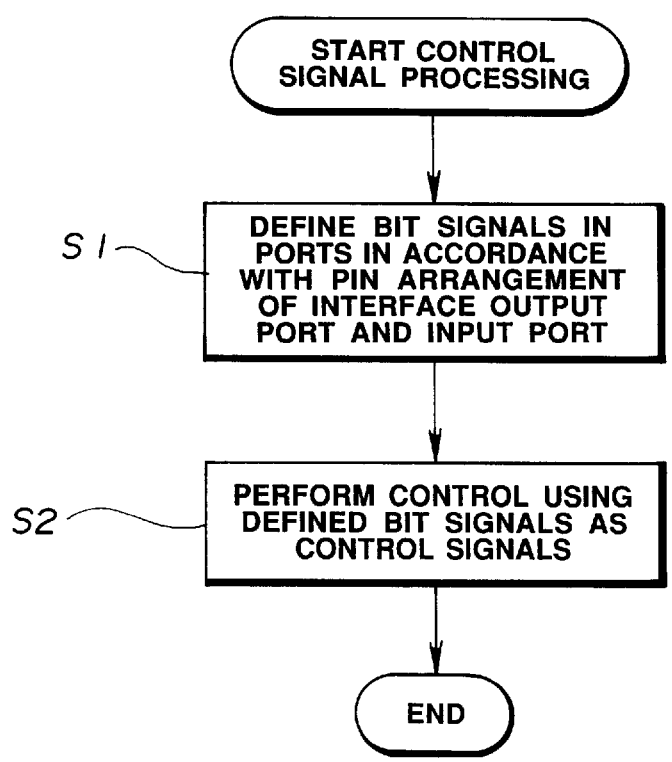
FIG. 3 is a flowchart showing the procedure of an initial processing of each emulation program used in the first embodiment.

FIG. 3 is a flowchart of control signal processing of each emulation program of the present embodiment.

This processing is performed before executing the selected emulation program.

First, in step S1, interface control information relating to the control of interface connector 105 is read by referring to a predetermined address within the storage device (ROM) of the emulating apparatus. Bit signals of an interface output port and an input port are defined based on that information.

Next, in step S2, the defined bit signals of the interface connector are used as control signals, which are given to the following emulation program.

Since the emulation itself is not directly related to the present invention, an explanation thereof is omitted.

Figure 4:
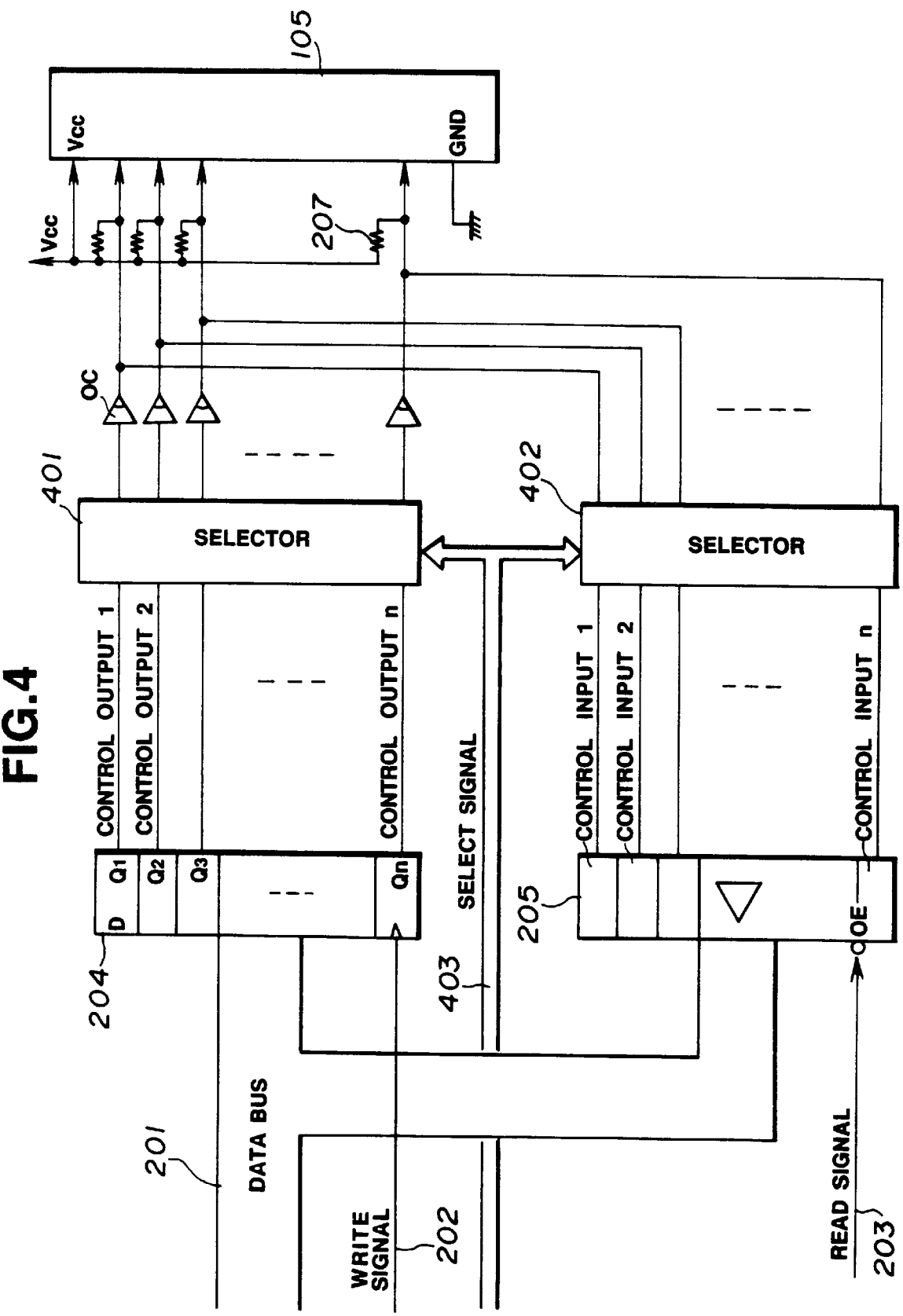
FIG. 4 is a block diagram of a host-computer interface unit according to a second embodiment of the present invention.

FIG. 4 is host-computer interface unit 104 in a second embodiment of the present invention. In FIG. 4, reference numerals 401 and 402 represent selectors, and reference numeral 403 represents a select signal. Other components are the same as those in the first embodiment and need not again be discussed.

In the present embodiment, respective bit signals of flip-flop 204 and input buffer 205 have a common meaning as seen from each emulation program. Selector 401 outputs a control signal input from flip-flop 204 to a specific terminal or pin of interface connector 105 in accordance with select signal 403. Selector 402 inputs a signal input from a terminal of interface connector 105 to a specific bit terminal of input buffer 205 as a control input in accordance with select signal 403. The bit terminal of input buffer 205 to which each bit terminal of interface connector 105 must correspond is determined by select signal 403. Thus, by setting select signal 403 as a signal peculiar to each control program, the target interface connector pin arrangement for a control program, such as an emulation program or the like, can be realized.

Figure 5:
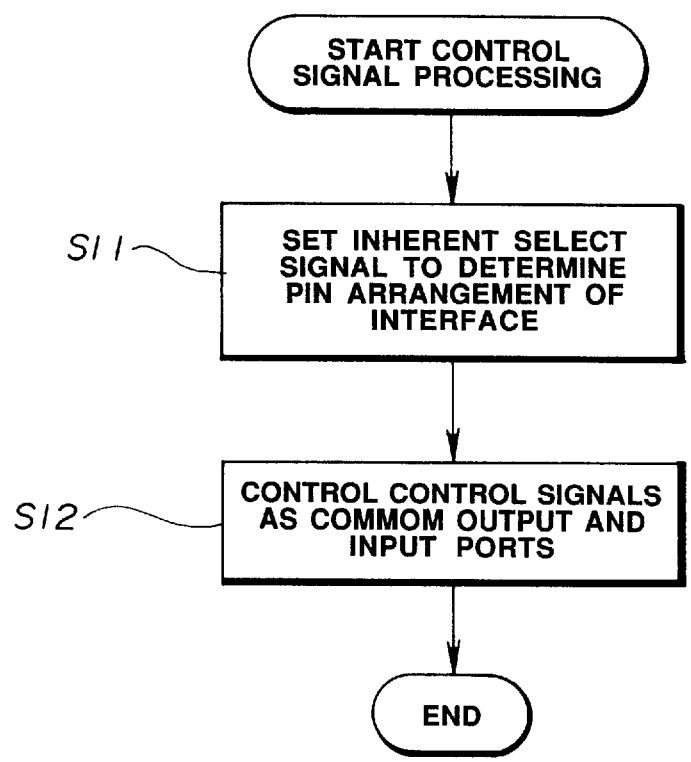
FIG. 5 is a flowchart showing the procedure of an initial processing of each emulation program used in the second embodiment.

FIG. 5 is a flowchart of control signal processing of each emulation program in the second embodiment. This processing is performed before executing the selected emulation program.

First, in step S11, interface control information relating to the control of interface connector 105 is read by referring to a predetermined address within the storage device (ROM) of the emulating apparatus, and select signal 403 is output based on that information.

Thus, flip-flop 204 and input buffer 205 function as common output and input ports. Hence, in step S12, control is effected by the following emulation program.

As described above, according to the present embodiments, the interface signal terminal arrangement of the emulating printing apparatus is set in accordance with an emulation program. Hence, the cable which is not connected to an apparatus can be used as a dedicated cable for various kinds of host computers. In addition, by performing control by a control signal, perfect emulation can be realized.

Although in the above-described embodiments, a desired control program is selected through operation panel 1501, a desired control program may be selected based on a command or the like transmitted from host computer 100. Alternatively, a control program (including interface control information) may be downloaded in a memory (including a RAM or the like, not shown) from host computer 100, and the control program may be selected based on an instruction from operation panel 1501 or host computer 100, or by an automatic switching function (to be described later).

Also in a printing apparatus having an emulation-program (a control-program) automatic switching function, in order to perform perfect emulation, after identifying a command system (a page description language) transmitted from host computer 100, and automatically selecting the corresponding emulation program (control program), interface control information corresponding to the selected control program is read, and the above-described control signal processing is performed. Thus, the present invention is achieved.

The present invention can, of course, be applied to a single apparatus, a system consisting of a plurality of apparatuses, and a system in which processing is performed via a network, such as LAN (local area network) or the like, provided that the function of the present invention is executed.

As described above, according to the present invention, the arrangement of signals from a connector for receiving data from the outside can be internally adjusted to a control program for processing the data.

The individual components shown in outline or designated by blocks in the drawings are all well-known in the output apparatus arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing apparatus for analyzing a plurality of individual control signals and a plurality of individual print data input from a host computer, said apparatus comprising:
    an interface connector having a plurality of signal terminals, said interface connector being connected to the host computer so that the individual control signals are input to said interface connector in one of a plurality of pin arrangements, each pin arrangement arranging the individual control signals in a different one-to-one relationship with said signal terminals;
    a memory for storing a plurality of emulation programs and a corresponding plurality of interface set information associating each of the emulation programs with a respective one of the pin arrangements, each emulation program further corresponding to a respective one of the plurality of individual print data and usable to analyze the plurality of individual control signals and print data input through said interface connector;
    selecting means for selecting one of the plurality of emulation programs to analyze the respective one of the plurality of individual print data; and
    control means for controlling the plurality of signal terminals to input the individual control signals from the host computer through said interface connector with the pin arrangement defined by the interface set information corresponding to the selected emulation program.

2. A printing apparatus according to claim 1, further comprising an operation panel, wherein said selecting means selects the one emulation program based on information input through the operation panel.

3. A printing apparatus according to claim 1, wherein said selecting means selects the one emulation program based on a command input from the host computer.

4. A printing apparatus according to claim 1, wherein said selecting means identifies a command system input from the host computer and automatically selects the one emulation program based on the command system.

5. A printing apparatus according to claim 1, further comprising a memory connector for connecting said apparatus to an external memory, the external memory storing a further emulation program and a corresponding further pin arrangement.

6. A printing apparatus according to claim 5, wherein said selecting means is enabled to select the one emulation program from each of said memory and the external memory.

7. A method operative in a printing apparatus for analyzing a plurality of individual control signals and a plurality of individual print data input from a host computer, the apparatus comprising an interface connector connected to the host computer and having a plurality of signal terminals, said method comprising the steps of:
    inputting the individual control signals to the interface connector, the interface connector being connected to the host computer so that the individual control signals are input to the interface connector in one of a plurality of pin arrangements, each pin arrangement arranging the individual control signals in a different one-to-one relationship with the signal terminals;
    storing, in a memory, a plurality of emulation programs and a corresponding plurality of interface set information associating each of the emulation programs with a respective one of the pin arrangements, each emulation program further corresponding to a respective one of the plurality of individual print data and usable to analyze the plurality of individual control signals and print data input through the interface connector;
    selecting one of the plurality of emulation programs to analyze the respective one of the plurality of individual print data; and
    controlling the Plurality of signal terminals to input the individual control signals from the host computer through the interface connector with the pin arrangement defined by the interface set information corresponding to the selected emulation program.

8. A method according to claim 7, the apparatus further comprising an operation panel, wherein said selecting step selects the one emulation program based on information input through the operation panel.

9. A method according to claim 7, wherein said selecting step selects the one emulation program based on a command input from the host computer.

10. A method according to claim 7, wherein said selecting step identifies a command system input from the host computer and automatically selects the one emulation program based on the command system.

11. A method according to claim 7, the apparatus further comprising a memory connector for connecting the apparatus to an external memory, the external memory storing a further emulation program and a corresponding further pin arrangement.

12. A method according to claim 11, wherein said selecting step is enabled to select the one emulation program from each of the memory and the external memory.

* * * * *

UNITED STATES PATENT AND TRADEMARK OFFICE
CERTIFICATE OF CORRECTION

PATENT NO. : 5,845,055

DATED : December 1, 1998

INVENTOR(S) : MASAHIKO MURATA

Page 1 of 2

It is certified that error appears in the above-identified patent and that said Letters Patent is hereby corrected as shown below:

Title page, item
[54] TITLE, and col. 1, line 2

"ACCOMODATING" should read --ACCOMMODATING--.

COLUMN 1

Line 1, "ACCOMODATING" should read --ACCOMMODATING--.

COLUMN 4

Line 52, "5" should be deleted.

COLUMN 5

Line 29, "input scan" should read
--105 can--.

UNITED STATES PATENT AND TRADEMARK OFFICE
CERTIFICATE OF CORRECTION

PATENT NO. : 5,845,055

DATED : December 1, 1998

INVENTOR(S) : MASAHIKO MURATA

It is certified that error appears in the above-identified patent and that said Letters Patent is hereby corrected as shown below:

COLUMN 8

Line 27, "Plurality" should read --plurality--.

Signed and Sealed this

Thirtieth Day of November, 1999

Attest:

Attesting Officer

Q. TODD DICKINSON

Acting Commissioner of Patents and Trademarks